United States Patent

Poola

[15] 3,639,112
[45] Feb. 1, 1972

[54] METHOD AND APPARATUS FOR MAKING GLASS WINDSHIELDS

[72] Inventor: Jagadeesan V. Poola, Bridgeport, W. Va.
[73] Assignee: PPG Industries, Inc., Pittsburgh, Pa.
[22] Filed: Jan. 16, 1970
[21] Appl. No.: 3,384

[52] U.S. Cl. ...................................... 65/29, 65/97, 65/158, 83/7, 83/56, 234/3, 356/120, 356/239
[51] Int. Cl. .................................... C03b 33/02, G01b 11/30
[58] Field of Search ....................... 65/29, 97, 105, 112, 158; 234/3; 83/7, 56; 356/120, 239; 250/83.3

[56] References Cited

UNITED STATES PATENTS 2,452,364  10/1948  Fowler et al. ....................... 65/29 UX
3,216,809  11/1965  Slabodsky .................................. 65/29
3,535,522  10/1970  Green .................................. 65/29 UX Primary Examiner—Reuben Friedman
Assistant Examiner—Saul R. Friedman
Attorney—Chisholm and Spencer

[57] ABSTRACT

Windshields are made from vertically drawn glass in accordance with a method that involves scanning substantially the entire width of the glass with a distortion-analyzer apparatus that produces a trace or other record proportional to the second derivative with respect to distance traversed of the thickness of the glass, and then cutting from the glass so scanned at least one piece of windshield blank, with the windshield blank being taken from a portion of the piece wherein said derivative is at a minimal value.

4 Claims, 5 Drawing Figures

PATENTED FEB 1 1972 3,639,112
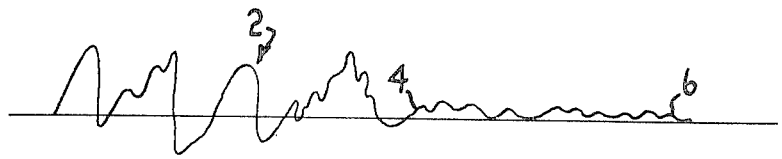
FIG. 1   ONE WINDSHIELD BLANK
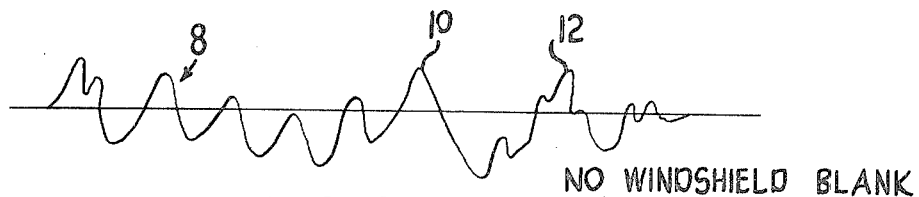
FIG. 2   NO WINDSHIELD BLANK
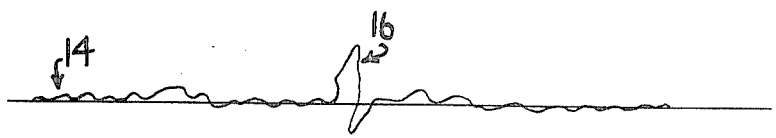
FIG. 3   TWO WINDSHIELD BLANKS
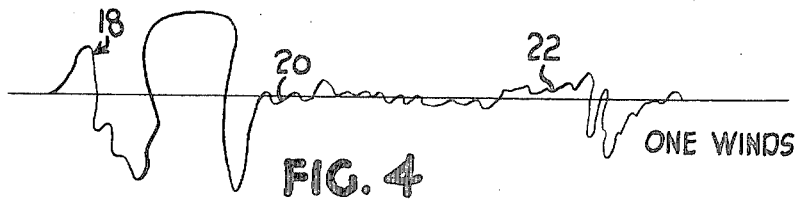
FIG. 4   ONE WINDSHIELD BLANK
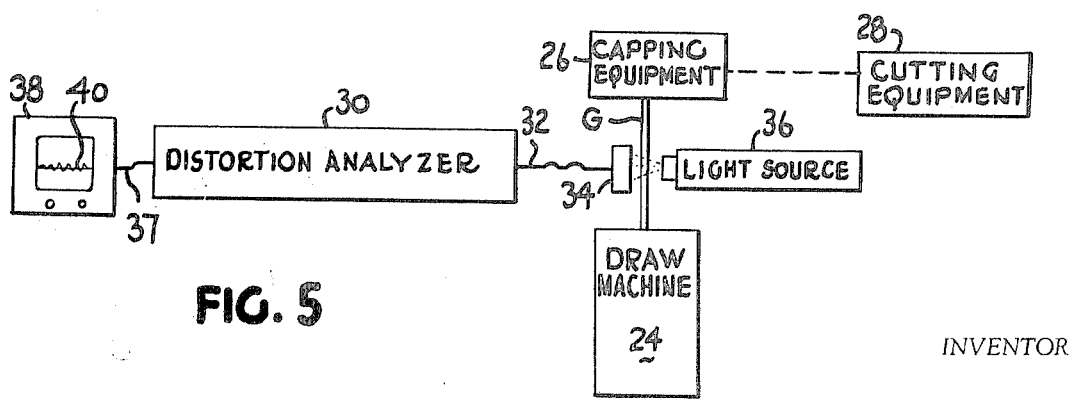
FIG. 5
INVENTOR
JAGADEESAN V. POOLA
BY  Chisholm and Spencer
ATTORNEYS

METHOD AND APPARATUS FOR MAKING GLASS WINDSHIELDS

BACKGROUND OF THE INVENTION

This invention relates to the making of automotive windshields from vertically drawn glass.

DESCRIPTION OF THE PRIOR ART

Prior to the present invention, automotive windshields and the like have not been made from vertically drawn glass, chiefly because of the problems involved in arriving at product of suitable low-distortion characteristics. Instead, windshields have been made of float glass or plate glass, two panes of such glass being pressed together with a suitable plastic interlayer to form the product windshield.

In testing flat glass for low-distortion characteristics, one known test is the Disappearance Test, such as that disclosed in James and Ward U.S. Pat. No. 3,097,942. Although this test is adequate to give an indication of improvement in the quality of vertically drawn sheet glass so long as the glass is of relatively low quality, the test tends to become inaccurate before the glass is so good in freedom from distortion as to become commercially acceptable for use in making windshields.

It is known, for example, from the copending application of Roy W. Yunker et al., Ser. No. 3,382 now abandoned filed of even date herewith, to construct and use a distortion-analyzer machine that produces an X-Y trace indicative of the second derivative of the thickness of the glass scanned by the machine. Said second derivative is, as taught in that copending application, closely related to the low-distortion characteristics of the glass.

SUMMARY OF THE INVENTION

Windshields are made from vertically drawn glass in accordance with a method that involves scanning substantially the entire width of the glass with a distortion-analyzer apparatus that produces a trace proportional to the second derivative with respect to distance traversed of the thickness of the glass, and then cutting from the glass so scanned at least one piece of windshield blank, with the windshield blank being taken from a portion of the piece wherein said derivative is at a minimal value.

DESCRIPTION OF THE DRAWINGS

A complete understanding of the invention may be had from the foregoing following description thereof, taken together with the appended drawings, in which:

FIG. 1 is a distortion-analyzer trace substantially across the entire width of the sheet of glass, the piece of glass being of such quality as to yield one windshield;

FIG. 2 is a distortion-analyzer trace substantially across the entire width of the sheet of glass, the piece of glass being of such quality so as to yield no windshields;

FIG. 3 is a distortion-analyzer trace substantially across the entire width of the sheet of glass, the piece of glass being of such quality so as to yield two windshields;

FIG. 4 is a distortion-analyzer trace substantially across the entire width of the sheet of glass, the piece of glass being of such quality so as to yield one windshield, taken from a particular location across the width of the sheet;

FIG. 5 is a schematic diagram of the apparatus of the invention.

DESCRIPTION OF THE PREFERRED EMBODIMENTS

In the production of sheet glass by a vertical drawing process, it is quite possible that some portions of the sheet will not exhibit the low-distortion characteristics that are required for windshield blanks, and those portions will need to be diverted to other uses or discarded. For example, let us assume that we have a ribbon nominally 100 inches wide, and we edge-trim 5 inches from each edge. That leaves a width of 90 inches, and it is quite possible that there will be saved from such an edge-trimmed sheet, 90 inches wide by 70 inches long, only one windshield blank, roughly 32 inches by 70 inches, corresponding to the best 32-inch section across the width of the sheet. To be surest of obtaining a windshield blank of high quality, the windshield blank is preferably cut so that its length is parallel to the length of the ribbon as it emerges from the drawing machine. When the process is operating slightly better, it is possible that there will be two such low-distortion sections across the width of the sheet, so that from a 70-inch length, two windshields will be saved. When the process is operating ideally so that the product is of exceptional quality throughout a large portion of the width of the ribbon, it will prove possible and desirable to cut the windshield blank the other way, i.e., so that its length runs across the ribbon rather than along it. This gives a remarkably better yield, but it is not always possible to obtain. In trying to produce sheet glass of remarkable low-distortion characteristics on a substantial scale, there are so many things that may change, having a consequent effect upon the quality of the portion of the sheet of glass being produced across its width, that it is usually necessary to count upon cutting windshield blanks from the sheet so that they run along the length of the ribbon.

In the absence of having sophisticated equipment for determining the quality of the glass sheet as respects its low-distortion characteristics, it is possible, for example, to take glass sheets 90 inches wide and 70 inches long and position them, held at a suitable angle, between a light source and a wall or screen, observing then the shadow produced on the wall or screen and determining from that whether to save from the sheet zero or one or two windshields. This practice is time-consuming, cumbersome, and not especially accurate. Because of the cumbersomeness of this practice, only a relatively small percentage of the blanks can be tested, with it ordinarily being necessary to test one and then to cut it and the next several or few dozen pieces the same way. This makes it difficult to control the quality of the product so that the proportion of rejected windshield blanks remain satisfactorily low.

Fortunately, there has been developed a distortion-analyzer apparatus that has hitherto been used for monitoring or determining the distortion quality of flat glass, and in particular of plate glass and float glass hitherto used for making windshields. The distortion-analyzer equipment is more fully described in the copending application of Roy W. Yunker et al., Ser. No. 3,382 now abandoned, filed of even date herewith. The machine yields, on an X-Y recorder, a trace of the second derivative of the thickness of the glass with respect to time or, what is the same thing if a constant traverse rate is used with respect to distance traversed, as determined by passing a sample of glass between a collimated source of visible light and a masked sensor, as described in the above-mentioned application, which is herein incorporated by reference. The equipment is such as to be sensitive to variations in apparent power magnification on the order of 0.005 diopter. An apparent power of magnification of 0.025 diopter (inverse meters) is obtained in a planoconcave or planoconvex lens having a sagitta of 130 microinches over a span of 0.5 inch.

Referring now to FIG. 1, let us assume that the line 2 represents such a distortion-analyzer trace. It would be seen that the line 2 has a portion, between the points 4 and 6, where the distortion sensed by the distortion analyzer is relatively low, such that one windshield can be saved.

Referring now to FIG. 2, the curve 8 is of such nature that obviously no windshield can be saved. In the curve 8, it will be understood that the points 10 and 12 indicate peaks that are indicative of distortion in the glass on the order of that produced by a microlens having a power of about 0.01 diopter, whereas in sheet glass of windshield quality, the maximum tolerable peak is on the order of 0.05 diopter and preferably is about 0.0375 diopter or less.

Referring now to FIG. 3, the curve 14 has two good areas, separated by a central region 16 wherein the distortion is excessive, and from a sample of glass yielding such a distortion-analyzer trace, two windshield blanks can be saved.

Referring now to FIG. 4, the curve 18 has a region, extending from the point 20 to the point 22, from which a windshield blank can be saved, and it is located rather peculiarly, starting slightly to the left of center of the sample and extending toward the right-hand edge but stopping substantially short of it.

It will be understood that the traces 2, 8, 14, and 18 refer to the entire width, as trimmed, of the sheet being produced, being on the order of 85 to 110 inches. While it is desirable that the distortion-analyzer equipment used be such as to scan such a length in one pass, equivalent results can be obtained, of course, with distortion-analyzer equipment having a path length of, for example, about 22 inches, taking traces for the left, the left-center, the right-center, and the right portions of the sheet as separate operations.

It is important to bear in mind that the distortion-analyzer readings are taken in a direction transverse to the length of the ribbon of glass as it is drawn, since when this is done, maximal readings are ordinarily obtained.

The method of the present invention involves scanning substantially the entire width of a piece of sheet glass that is being drawn with a distortion-analyzer apparatus that produces a record, e.g., a trace on an X-Y recorder, proportional to the various values, as one passes along the testing path, of the second derivative with respect to distance traversed of the thickness of glass scanned, and then cutting from said piece at least one windshield blank, the windshield blank being taken from a portion of the piece wherein the said second derivative as indicated by the trace remains at less than a predetermined value, such as 0.0375 diopter maximum.

In practicing this method, it is preferable to have at least one, and possibly more than one, distortion-analyzer apparatus capable of scanning a path at least as long as 70 inches mounted in operative association with a drawing machine, e.g., on the cutting floor. In one way of practicing the method, the distortion-analyzer equipment is used to produce a trace, and then a trained operator looks at the trace and then sets the cutting equipment for making longitudinal cuts in the glass accordingly. Alternatively, the trained operator may merely mark, with chalk or paint or the like, the portion of glass that is to be saved, or the portion of glass that is to be discarded, with the cutting of the windshield blanks then being performed by hand or by a cutting machine operator as a separate operation. It is also possible, of course, to practice the method by using suitable automatic equipment whereby the cuts are made automatically in locations selected in accordance with criteria built into the machine.

When the method of this invention is used, it becomes possible, with a high degree of reliability, to cut suitable windshield blanks from vertically drawn sheet glass. Since tedious and time consuming handling of the large pieces of glass is avoided, and since the distortion-analyzer equipment operates reasonably rapidly, it becomes possible to test a considerably larger fraction of the product, thereby improving quality control.

Although this invention may be used in producing windshield blanks and the like from glass of any thickness that is produced in a vertical drawing machine, the invention is of particular usefulness in the making of windshield blanks that are 0.030 to 0.080 inch thick. Glass having both this quality and this thinness is not produced by the float or plate processes.

Referring now to FIG. 5, there is indicated schematically apparatus for use in practicing the method of the invention. This comprises a drawing machine 24, from which there issues a sheet or ribbon of glass G, which is led to capping equipment 26, in which the glass is transversely scored, snapped, and laid down. Operatively associated with the capping equipment, there is cutting equipment 28 for making transverse cuts in the glass at selected locations. A distortion analyzer 30 received by a line 32 from a sensor 34 visible light emanating from a source 36 and passing through the glass G. The distortion analyzer produces, through a line 37 leading to an X-Y recorder 38 a trace 40 on the recorder 38, with the trace 40 corresponding to the second derivative of the thickness of the glass and yielding a sensitive indication of its properties as respects low-distortion characteristics. It is to be understood that the light source 36 and the sensor 34 are mounted, by means not shown, for motion along a path length, corresponding substantially to the entire width of the ribbon of glass being tested. Vertical drawing machines have never, prior to this invention, been provided with such equipment, and as a consequence, the prior art has lacked equipment for obtaining the desired result, namely, the production from vertically drawn glass of thin low-distortion windshield blanks.

Although I have referred hereinabove to the use of an X-Y recorder, it will be apparent to those skilled in the art that various equivalent means can be used to perform the same function—using magnetic tape, punched paper tape, or the programming of the memory of a computer of either the digital type or the analog type. The X-Y recorder is mentioned chiefly because it is a convenient and relatively inexpensive means for use in the practice of the invention.

When obtained, the thin windshield blanks are further processed in a manner familiar to those skilled in the art. For example, a windshield blank produced in accordance with this invention may be assembled together with a suitable plastic interlayer and another windshield blank of float glass 0.125 inch thick to form a finished windshield in accordance with conventional practices.

I claim as my invention:

1. In a method of making windshields from vertically drawn glass, the improvement that comprises:
   scanning substantially the entire width of the piece of the sheet being drawn with a distortion-analyzer apparatus that produces on a recording means a record proportional to the second derivative with respect to distance traversed of the thickness of the glass scanned, said distortion-analyzer apparatus being of such sensitivity as to detect peak thickness variations that have an apparent power on the order of 0.025 diopter, and
   cutting in accordance with the indications of said record from said piece at least one windshield blank, said windshield blank being taken from a portion of said piece wherein said derivative as indicated by said record remains at less than 0.0375 diopter.

2. The improvement defined in claim 1, characterized in that said recording means is an X-Y recorder and said record comprises a trace produced by said X-Y recorder.

3. In combination with a vertical drawing machine from which a sheet of glass issues and capping equipment receiving said sheet of glass, a distortion analyzer for scanning in a one pass substantially the entire width of said sheet of glass and producing signals and a recording means responsive to said signals for producing a record indicative of the variations in the second derivative of the thickness of the glass with respect to distance traversed, said distortion analyzer being sensitive to variations in said second derivative on the order of 0.025 diopter.

4. Apparatus as defined in claim 3, characterized in that said recording means comprises an X-Y recorder and said record comprises a trace produced by said X-Y recorder.

* * * * *